July 8, 1924.
L. C. MARSHALL
PISTON RING
Filed Aug. 20, 1921
1,500,252
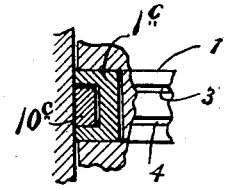
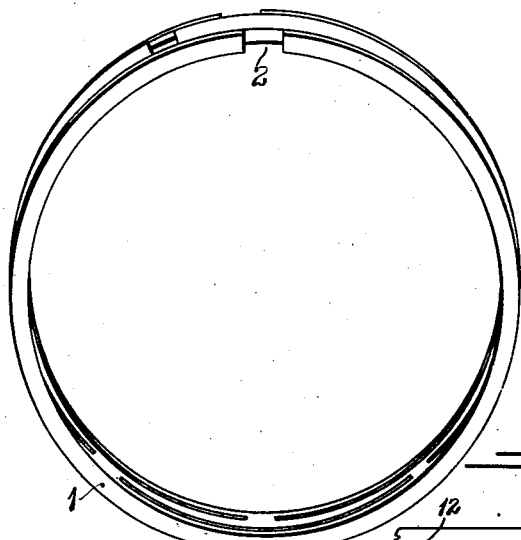
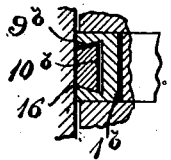
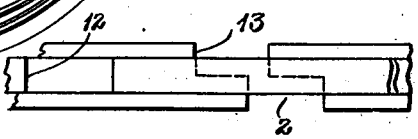
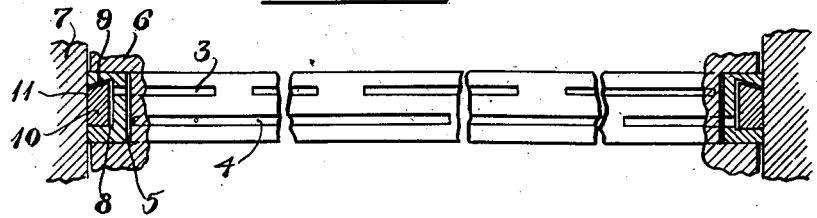
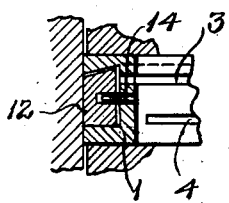
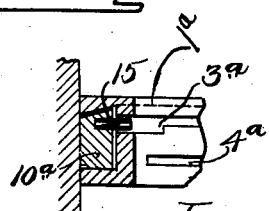
Inventor:
Lewis C. Marshall.
by Roberts Roberts & Cushman
his attys Patented July 8, 1924.

1,500,252

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON RING.

Application filed August 20, 1921. Serial No. 493,794.

*To all whom it may concern:*

Be it known that I, LEWIS C. MARSHALL, a citizen of the United States of America, and resident of Walpole, in the county of Norfolk and State of Massachusetts, have invented new and useful Improvements in Piston Rings, of which the following is a specification.

This invention concerns metallic packings for the pistons of internal combustion engines and relates more particularly to that type of packing comprising a plurality of associated rings.

The purpose of such a packing is to avoid the leakage of gas or oil under pressure between the piston and the cylinder wall, and in order to accomplish the desired result it is necessary that the packing comprise a member resiliently engageable with the cylinder wall at all times and regardless of the expansion or contraction of the parts due to temperature variation.

It is also essential that such packing fit snugly in the piston grooves in which it is lodged in order to prevent leakage beneath the same. Heretofore great difficulty has been experienced in the attempt to combine these features in a packing of practical type and the object of the present invention is to provide a piston packing having the above noted desirable characteristics embodied in a simple and desirable structure.

To this end it is proposed to employ a main packing ring, preferably of an axially expansible type, which will fit snugly and substantially gas tight within the piston groove. Such ring may have a circumferential groove in its outer surface for the reception of an auxiliary ring. The groove in the ring may be undercut at one, or both sides and the auxiliary ring may be bevelled to correspond to such undercut sides of the groove. The auxiliary ring as thus arranged should be relatively loose in its groove, the bevelled edge of the ring engaging the undercut side of the groove and serving to prevent escape of the ring from its groove while permitting it freely to expand to an extent such that its outer face projects beyond the outer face of the main ring. As thus arranged, though the main ring should bind in its groove, the auxiliary ring would be free to expand into contact with the cylinder wall whereby a permanent gas tight joint is ensured. Moreover, by reason of the loose fit of the auxiliary ring in its groove it is very responsive to irregularities in the cylinder wall thus forming a quick seating ring of high efficiency.

For maintaining such auxiliary ring at its highest resiliency in a radial direction while at the same time breaking joints between the rings it is essential that the slot in such ring be located at a point adjacent to, but to one side of the slot in the main ring, and for this purpose a stop element, preferably in the form of a pin projecting from one of the rings and engageable with the other may be provided. If the main ring be of that axially expansible type having radially extending circumferential slits therein, such pin might well be fixed in the auxiliary ring and extend through one of such slits or a widened portion thereof, thus providing for limited relative movement of the rings in the desired amount.

In the accompanying drawings there is illustrated by way of example, one embodiment of the invention well adapted for carrying the above object into effect.

Figure 1 is a perspective view of a composite piston packing ring constructed in accordance with the present invention:

Figure 2 is a fragmentary cross section through a cylinder and piston, and illustrating the packing ring as seated in the piston groove;

Figure 3 is a fragmentary side elevation showing the end portion of the main packing ring with the auxiliary packing ring operatively positioned relative thereto;

Figure 4 is a fragmentary transverse sectional detail through the main ring at a point between the ends of the auxiliary ring, illustrating means which may be employed for preventing relative movement of the rings;

Figure 5 is a view similar to Fig. 4, but illustrating a modification of the holding means; and Figures 6 and 7 are cross sectional views through the main and auxiliary rings illustrating modifications.

The main packing ring is indicated at 1, such ring having a gap at 2. If desired, and as herein illustrated, the end of the main ring at the gap may be formed to overlap in order to break the joint between them. The main ring illustrated herein is of the type more fully shown and described in the copending application of Lewis C. Marshall, filed August 20, 1921, and having Ser. No. 493,793.

This ring is provided with series of circumferentially spaced slits 3, 4, such slits serving to render the ring resiliently compressible in an axial direction. A ring of this character may be formed of a width equal to or greater than that of the piston groove and may be compressed sufficiently to permit its entrance within the groove. When seated in the groove its elasticity causes it to bear against the side walls of the grooves with sufficient force to prevent leakage beneath the same. The ring 1, in use, is seated within a groove 5 in a piston 6 slidable within a cylinder 7.

The outer circumferential face of the main ring 1 is provided with a slot or groove 8, preferably located midway between its edges. As shown in Fig. 2 the side 9 of such groove is undercut and cooperating with such groove and seated therein is an auxiliary ring 10. This ring is resiliently expansible and is of such dimensions as to fit loosely within the groove 8. The outer surface 11 of the auxiliary ring may thus be substantially less in width than that of the outer opening of the slot, thus permitting the ring to expand outwardly slightly beyond the outer surface of the main ring. As the ring 9 is thus free to expand in its slot it tends to seat quickly against the interior wall of the cylinder, thus forming a gas-tight joint between the same and the cylinder. The expansive action of the auxiliary ring is independent of that of the main ring and thus if the latter should stick in the piston groove, the auxiliary ring would still maintain a tight joint between the piston and cylinder. The gap in the auxiliary ring should preferably be located at a point adjacent to but out of alinement with the gap in the main ring. As shown in Fig. 3, the end 12 of the auxiliary ring is spaced from the end 13 of the main ring such a distance as to cause the gaps in the rings to be staggered with respect to each other. For preventing the auxiliary ring from creeping relative to the main ring, a pin 14 may project from a solid portion of the main ring into the space between the ends of the auxiliary ring. The latter ring is thus free to move slightly in a circumferential direction, thus allowing it to expand without substantial restriction, while at the same time preventing the gap therein from traveling to a point opposite the gap in the main ring. A modified arrangement for preventing such movement is illustrated in Fig. 5 wherein the main ring 1$^a$ is shown as provided with the slits 3$^a$, 4$^a$, respectively and the auxiliary ring 10$^a$ is shown as having a pin 15 projecting therefrom into a widened portion of one of the slits such as 3$^a$. With this arrangement also, any substantial movement of the auxiliary ring relatively to the main ring is prevented.

In Fig. 6 the main ring 1$^b$ is shown as provided with a groove for the reception of the auxiliary ring 10$^b$, but in this case both sides 9$^b$ and 16 of the groove in the main ring are bevelled providing a groove of dove-tail cross section, while the auxiliary ring is correspondingly bevelled to fit within such groove. With either of the arrangements illustrated in Figs. 2 and 6, the auxiliary ring is interlocked with the main ring and is thus prevented from escaping entirely from the groove in the latter, while at the same time, by reason of its loose fit in such groove, it is free to expand to the desired amount. In Fig. 7 the main ring 1$^c$ is shown as having a radial walled groove, the auxiliary ring 10$^c$ fitting therein but without interlocking therewith.

While the invention has been illustrated as embodied in a ring which is axially compressible and of that type described more fully in the above-noted application, it is contemplated that under some circumstances the auxiliary ring with its positioning means might well be employed in connection with a main packing ring of other form, and it is also contemplated that various changes and modifications in proportions and shapes of parts might well be made without departing from the spirit of the present invention.

Having thus described the invention in a preferred embodiment of the same, what I claim and desire to secure by Letters Patent of the United States is:—

1. A piston ring having an undercut groove disposed centrally of the width of its outer circumferential surface, and a ring loosely fitting within said groove, said ring having a bevelled edge corresponding to the undercut surface of the groove.

2. An axially compressible main piston ring and an auxiliary piston ring having interlocking engagement with the main ring, said rings being so constructed and arranged as to permit limited axial compression of the main ring.

3. A piston ring having a dove-tail, circumferential groove in its outer peripheral surface, and an auxiliary piston ring seated therein and of a cross section to interlock with said groove, the outer face of said auxiliary ring being of a width less than the external width of the groove.

4. A composite packing for pistons comprising an axially expansible main ring having a circumferential groove in its peripheral surface, said groove having opposite side walls and a radially expansible ring seated in said groove between said walls.

5. In combination with a cylinder having a peripherally grooved piston therein, an axially and radially expansible main ring seated in said groove, said ring having a centrally disposed circumferential groove in its outer peripheral surface, and a radially expansible auxiliary ring loosely seated within said groove.

6. In combination with a cylinder, a piston having a groove therein, a main packing ring constructed and arranged to maintain a continuous resilient thrust against the opposite walls of the groove, and an auxiliary ring engaging said main ring along the median line of its peripheral surface and constructed and arranged to maintain a continuous resilient pressure against the cylinder wall.

7. A composite packing for pistons comprising a main ring for engagement with a piston groove, said ring having a circumferential groove of dove-tail cross section disposed centrally of its width in its outer periphery, an auxiliary ring of somewhat less width than the groove and having interlocking engagement therewith, and a pin outstanding from one of said rings and engageable with an element of the other whereby to limit circumferential movement of one of said rings relatively to the other.

8. A composite packing for pistons comprising an axially compressible main ring engageable with a piston groove, an auxiliary ring seated within a circumferential groove in the outer peripheral surface of the main ring, said ring being of less width than the groove, and a pin projecting radially inward from said auxiliary ring and engaging a circumferential slot in said main ring.

9. In combination with a cylinder and a piston having a groove therein, a packing ring held under axial compression between the opposed walls of said groove, said ring having a series of spaced, circumferentially extending slits therethrough, said ring also having a circumferential groove in its outer peripheral surface, an auxiliary ring loosely held within said groove, and a stop pin projecting from said auxiliary ring and engaging one of the slits in the first named ring.

10. A composite piston packing comprising a main ring having staggered series of circumferentially elongate radial openings separated by solid portions, and a radially expansible auxiliary ring having interlocking engagement with said main ring.

Signed by me at Boston, Massachusetts, this 13th day of August, 1921.

LEWIS C. MARSHALL.